(12) United States Patent
Hatta et al.

(10) Patent No.: US 8,323,827 B2
(45) Date of Patent: Dec. 4, 2012

(54) LAMINATE PACKING MATERIAL FOR BATTERY AND LAMINATE BATTERY

(75) Inventors: Kazuhito Hatta, Shinagawa-ku (JP); Masato Sato, Koriyama (JP); Tsuyoshi Sugiyama, Shinagawa-ku (JP); Hiroyuki Yamada, Koriyama (JP); Tadashi Miebori, Koriyama (JP); Koji Minamitani, Isehara (JP); Hiroshi Hata, Isehara (JP); Koji Miyano, Isehara (JP); Jun Tanigawa, Isehara (JP)

(73) Assignee: Showa Denko Packaging Co., Isehara-shi (JP)

( * ) Notice: Subject to any disclaimer, the term of this patent is extended or adjusted under 35 U.S.C. 154(b) by 650 days.

(21) Appl. No.: 12/158,548

(22) PCT Filed: Dec. 14, 2006

(86) PCT No.: PCT/JP2006/324962
§ 371 (c)(1),
(2), (4) Date: Oct. 30, 2009

(87) PCT Pub. No.: WO2007/072736
PCT Pub. Date: Jun. 28, 2007

(65) Prior Publication Data
US 2010/0040942 A1     Feb. 18, 2010

(30) Foreign Application Priority Data

Dec. 22, 2005   (JP) .................................. 2005-369446
Dec. 22, 2005   (JP) .................................. 2005-369460

(51) Int. Cl.
*H01M 2/02*      (2006.01)

(52) U.S. Cl. ........................................ 429/168; 429/163
(58) Field of Classification Search ...................... None
See application file for complete search history.

(56) References Cited

U.S. PATENT DOCUMENTS

2004/0029001 A1* 2/2004 Yamazaki et al. ............ 429/176
2006/0057458 A1* 3/2006 O'Dea et al. .................. 429/164

FOREIGN PATENT DOCUMENTS

| JP | 11 185728 | 7/1999 |
| JP | 2001 102011 | 4/2001 |
| JP | 2001 176465 | 6/2001 |
| JP | 2003-303580 | 10/2003 |
| JP | 2004 327045 | 11/2004 |

OTHER PUBLICATIONS

U.S. Appl. No. 12/599,704, filed Nov. 11, 2009, Hata.

(Continued)

*Primary Examiner* — Patrick Joseph Ryan
*Assistant Examiner* — Wyatt McConnell
(74) *Attorney, Agent, or Firm* — Oblon, Spivak, McClelland, Maier & Neustadt, L.L.P.

(57) ABSTRACT

In a laminated external packaging material for a battery according to the present invention, a metallic foil 2 is adhered to one surface side of a base film 1, and a coated film layer 4 of thermal adhesive resin having a softening point of 160° C. or below and capable of thermally bonding to a surface film of a battery main body is formed on the other surface side of the base film 1. With this laminated external packaging material for a battery, without using an adhesive tape or a hot-melt adhesive, this packaging material can be easily and assuredly bonded to the battery main body and also can be bonded firmly to an end portion reinforcing plastic component.

16 Claims, 5 Drawing Sheets

OTHER PUBLICATIONS

U.S. Appl. No. 13/299,017, filed Nov. 17, 2011, Hata.
Notification of Reasons for Refusal issued on Jan. 25, 2012 in the corresponding Japanese Patent Application No. 2005-369446 (with English Translation).

* cited by examiner ated external packaging material for wrapping around a main body of a battery for use as a power source for a mobile device, such as, e.g., a mobile telephone, a notebook-size personal computer, or a digital camera, and also relates to a laminate battery, i.e., a battery packaged with the laminated external packaging material.

In this specification and claims, the wording of "aluminum" is used to include the meaning of pure aluminum and aluminum alloy.

BACKGROUND ART

In recent years, in accordance with reduction in size and weight of a mobile electronic device, also in a lithium-ion battery and a lithium-polymer battery for use in such a mobile electronic device, the reduction in weight has been attained by using, in place of a conventional metallic can, a laminated external packaging material in which plastic films are adhered to both surfaces of an aluminum foil having a thickness of about 20 to 100 μm as an external packaging material.

In this laminated external packaging material, however, a soft aluminum foil softened by annealing is used so that press forming thereof can be performed. Therefore, there are such drawbacks that the packaging material deteriorates in material strength, resulting in easy breakage due to external impacts and that pinholes can be easily generated in the packaging material. To cope with the problems, in a laminate battery using a conventional laminated external packaging material, the battery is often put in a plastic injection molded container to compensate for the deteriorated strength of the external packaging material (see Patent Document 1). This results in an increased weight and an increased number of components per battery.

Under the circumstances, recently proposed is a method for reinforcing a battery main body by wrapping around the main body with a non-annealed hard aluminum foil or a non-annealed hard aluminum foil having a plastic film adhered on one or both surfaces of the foil and fitting plastic components into both end portions of the battery main body.

Patent Document 1: Japanese Unexamined Laid-open Publication No. H11-185728

DISCLOSURE OF THE INVENTION

Problems to be Solved by the Invention

However, since a hard aluminum foil is too strong in material strength, it tends to restore its original state after bending processing or forming processing thereof. This requires binding of the battery main body wrapped by the hard aluminum foil with an adhesive tape, press-bonding of the battery main body and the aluminum foil with a two-sided adhesive tape interposed therebetween, or thermal bonding of the battery main body and the aluminum foil with a molten hot-melt adhesive or film interposed therebetween. Therefore, in the aforementioned methods, there are drawbacks that the number of components constituting the battery external packaging increases and that the incorporation of the mechanism for supplying/adhering the adhesive tape or the hot-melt adhesive complicates the battery production line and increases the facility cost.

In view of the aforementioned circumstances, the present invention aims to provide a laminated external packaging material capable of easily and assuredly bonding to a battery main body without using an adhesive tape or a hot-melt adhesive, and also, in the case of using plastic components for reinforcing end portions of the battery main body, capable of firmly bonding to the plastic component, which in turn can reduce the number of components constituting a laminate battery and also can simplify a battery production line.

In order to attain the aforementioned objects, the present invention provides the following means.

[1] A laminated external packaging material for a battery, wherein a metallic foil is adhered to one surface side of a base film, and wherein a coated film layer of thermal adhesive resin having a softening point of 160° C. or below and capable of thermally bonding to a surface film of a battery main body is formed on the other surface side of the base film.

[2] The laminated external packaging material for a battery as recited in the aforementioned Item 1, wherein the thermal adhesive resin of the coated film layer is ethylene-vinyl acetate copolymer.

[3] The laminated external packaging material for a battery as recited in the aforementioned Item 1, wherein a thickness of the coated film layer is 0.5 to 10 μm.

[4] The laminated external packaging material for a battery as recited in the aforementioned Item 1, wherein the base film is made of thermoplastic resin capable of thermally bonding to an end portion reinforcing plastic component of the laminate battery.

[5] The laminated external packaging material for a battery as recited in the aforementioned Item 1, wherein an oriented film having a thickness of 8 to 40 μm is adhered to a surface of the metallic foil opposite to the base film adhering side of the metallic foil.

[6] The laminated external packaging material for a battery as recited in the aforementioned Item 1, wherein a thermoset resin layer having a thickness of 0.5 to 5 μm is adhered to a surface of the metallic foil opposite to the base film adhering side of the metallic foil.

[7] The laminated external packaging material for a battery as recited in the aforementioned Item 1, where in the metallic foil is a hard aluminum foil.

[8] A laminate battery, wherein the laminated external packaging material as recited in any one of the aforementioned Items 1 to 7 are wrapped around a battery main body with the coated film layer side of the packaging material in contact with the battery main body and thermally bonded thereto, and wherein at least a part of an end portion reinforcing plastic component is inserted in each cylindrical portion constituted by an excessive portion of the laminated external packaging material and protruded from each of both ends of the battery main body and thermally bonded to the base film of the laminated external packaging material.

[9] A laminated external packaging material for a battery, wherein a metallic foil is adhered to one surface side of a base film, and wherein a coated film layer of thermal adhesive resin having a softening point of 160° C. and capable of thermally bonding to a surface film of a battery main body is formed on the other surface side of the base film in a state in which base film exposed edge portions are remained at both widthwise edge portions of the base film.

[10] The laminated external packaging material for a battery as recited in the aforementioned Item 9, wherein the thermal adhesive resin of the coated film layer is ethylene-vinyl acetate copolymer.

[11] The laminated external packaging material for a battery as recited in the aforementioned Item 9, wherein the base film is made of thermoplastic resin capable of thermally bonding to an end portion reinforcing plastic component of a laminate battery.

[12] The laminated external packaging material for a battery as recited in the aforementioned Item 9, wherein an oriented film having a thickness of 8 to 40 μm is adhered to a surface of the metallic foil opposite to the base film adhering side of the metallic foil.

[13] The laminated external packaging material for a battery as recited in the aforementioned Item 9, wherein a thermoset resin layer having a thickness of 0.5 to 5 μm is adhered to a surface of the metallic foil opposite to the base film adhering side of the metallic foil.

[14] The laminated external packaging material for a battery as recited in the aforementioned Item 9, wherein the metallic foil is a hard aluminum foil.

[15] A laminate battery, wherein the laminated external packaging material as recited in any one of the aforementioned Items 9 to 14 are wrapped around a battery main body with the coated film layer side of the packaging material in contact with the battery main body and thermally bonded thereto, and wherein at least a part of an end portion reinforcing plastic component is inserted in each cylindrical portion constituted by an excessive portion of the laminated external packaging material and each protruded from both ends of the battery main body and thermally bonded to a base film exposed edge portion of an inner surface of the cylindrical portion.

A hard aluminum foil means an aluminum foil in a work hardened state after working (rolling), and can be exemplified by, for example, a foil obtained by executing work hardening or a foil obtained by executing an appropriate heat treatment after work hardening, such as, e.g., foils generally called HX1, HX2, HX3, HX4, HX5, HX6, HX7, HX8, HX9 (where X: 1 to 3) in accordance with JIS Standard (JIS H0001). On the other hand, a soft aluminum foil means an aluminum foil other than the aforementioned hard aluminum foil, and can be exemplified by foils in a softened state after full annealing, such as, e.g., foils generally called "O material" in accordance with JIS standard (JIS H0001).

Effects of the Invention

The laminated external packaging material for a battery according to the invention [1] itself is provided with a coated film layer capable of thermally bonding to a surface film of a battery main body. Therefore, at the time of packaging the battery main body, without using any adhesive tape or hot-melt adhesive, the packaging material can be thermally bonded directly to the battery main body with easy, which enables reduction of the number of parts constituting a laminate battery and simplification of the battery production line. Since the coated film layer is made of thermal adhesive resin having a softening point of 160° C. or below, the laminated external packaging material can be bonded to the battery main body by a temperature heating of 160° C. or below in a state in which the packaging material wraps around the battery main body with the coated film layer side in contact with the battery main body, which in turn can prevent thermal degradation, such as, e.g., melting of separators in the battery main body or decomposition of the electrolytic solution. Thus, high battery performance can be maintained.

According to the invention [2], the thermal adhesive resin of the coated film layer is ethylene-vinyl acetate copolymer, which exerts thermal adhesiveness excellent to the surface film of the battery main body and decreases viscosity when heated to exert high thermal fluidity. Therefore, in the case of using an end portion reinforcing plastic component, when the plastic component and the laminated external packaging material are thermally pressure-bonded at a high temperature, the molten thermal adhesive resin of the coated film layer will be removed from the pressure-bonded portion, resulting in strong adhesion between the base film and the plastic component.

According to the invention [3], since the coated film layer of the laminated external packaging material for a battery has a certain thickness, thermal bonding to the battery main body can be performed at a low temperature in a short time period. Furthermore, in the thermal pressure-bonding to the end portion reinforcing plastic component, the resin can be easily removed from the pressure-bonded portion at the time of thermal bonding.

According to the invention [4], since the base film of the laminated external packaging material for a battery is capable of thermally bonding to an end portion reinforcing plastic component of the laminate battery, the base film and the plastic component can be strongly bonded by high temperature pressure bonding at a portion away from the battery main body.

According to the invention [5], since the oriented film having a specified thickness adhered to the external surface of the metallic foil of the laminated external packaging material for a battery functions as a protection layer, abrasion resistance, impact resistance, and chemical resistance can be given to the external packaging of the laminate battery.

According to the invention [6], since the thermoset resin layer having a specified thickness adhered to the external surface of the metallic foil of the laminated external packaging material for a battery functions as a protection layer, abrasion resistance, impact resistance, and chemical resistance can be given to the external packaging of the laminate battery.

According to the invention [7], since a hard aluminum foil is used as a metallic foil, further reduction in weight can be attained.

In the laminate battery according to the invention [8], the aforementioned laminated external packaging material for a battery can be bonded assuredly to the battery main body and the end portion reinforcing plastic component can be strongly bonded to the base film of the laminated external packaging material at both ends of the battery.

In the laminated external packaging material for a battery according to the invention [9], since the packaging material itself is provided with a coated film layer capable of thermally bonding to the surface film of the battery main body, at the time of packaging the battery main body, without using any adhesive tape or hot-melt adhesive, the packaging material can be thermally bonded directly to the battery main body with easy, which enables reduction of the number of parts constituting a laminate battery and simplification of the battery production line. Since the coated film layer is made of thermal adhesive resin having a softening point of 160° C. or below, the laminated external packaging material can be bonded to the battery main body by a temperature heating of 160° C. or below in a state in which the packaging material wraps the battery main body with the coated film layer side in contact with the battery main body, which in turn can prevent thermal degradation, such as, e.g., melting of separators in the battery main body or decomposition of the electrolytic solution. Thus, high battery performance can be maintained. Furthermore, in the case of using the end portion reinforcing plastic component, the external packaging material and the plastic component can be strongly bonded by thermally pressure-bonding the exposed edge portion of the base film of the external packaging material and the plastic component.

According to the invention [10], since the thermal adhesive resin of the coated film layer is ethylene-vinyl acetate copolymer, excellent thermal adhesiveness to a surface film of a battery main body can be exerted even by low temperature pressure-bonding.

According to the invention [11], since the base film of the laminated external packaging material for a battery is capable of thermally bonding to an end portion reinforcing plastic component, the exposed edge portion of the base film of the external packaging material and the plastic component can be bonded strongly.

According to the invention [12], since the oriented film having a specified thickness adhered to the external surface of the metallic foil of the laminated external packaging material for a battery functions as a protection layer, abrasion resistance, impact resistance, and chemical resistance can be given to the external packaging of the laminate battery.

According to the invention [13], since the thermoset resin layer having a specified thickness adhered to the external surface of the metallic foil of the laminated external packaging material for a battery functions as a protection layer, abrasion resistance, impact resistance, and chemical resistance can be given to the external packaging of the laminate battery.

According to the invention [14], since a hard aluminum foil is used as a metallic foil, further reduction in weight can be attained.

In the laminate battery according to the invention [15] the aforementioned laminated external packaging material for a battery can be bonded assuredly to the battery main body and the end portion reinforcing plastic component can be strongly bonded to the base film of the laminated external packaging material at both ends of the battery.

BRIEF DESCRIPTION OF DRAWINGS

FIG. 1 sequentially shows steps of forming external packaging for a laminate battery to which a first invention is applied, wherein FIG. 1(A) is a schematic perspective view showing a state before wrapping a battery main body with a laminated external packaging material, wherein FIG. 1(B) is a schematic perspective view showing a state after the wrapping, and wherein

FIG. 5 sequentially shows steps of forming external packaging for a laminate battery to which a second invention is applied, wherein FIG. 5(A) is a schematic perspective view showing a state before wrapping a battery main body with a laminated external packaging material, wherein FIG. 5(B) is a schematic perspective view showing a state after the wrapping, and wherein

DESCRIPTION OF REFERENCE NUMERALS

Figure 1A:
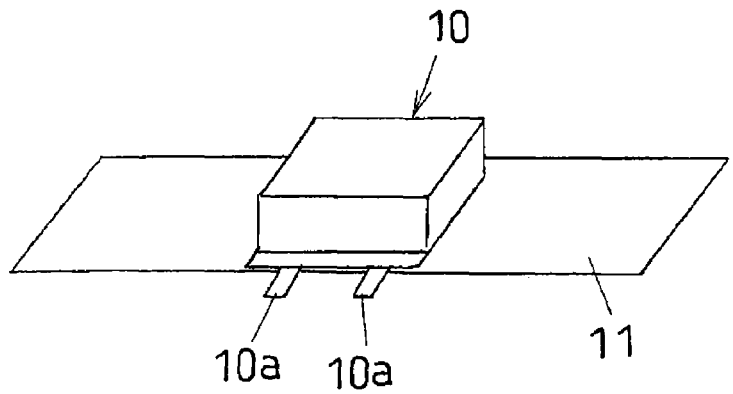

1 ... base film
1a ... exposed edge portion
2 ... metallic foil
3 ... adhesive layer
4 ... coated film layer of thermal adhesive resin
5 ... oriented film
6 ... adhesive layer
7 ... thermoset resin layer
10 ... battery main body
11 ... laminated external packaging material
11a ... cylindrical portion
12 ... end portion reinforcing plastic component

BEST MODE FOR CARRYING OUT THE INVENTION

Hereinafter, a laminated external packaging material for a battery according to a first invention will be explained.

Figure 1B:
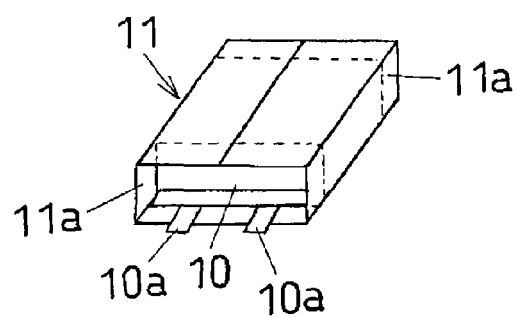
Figure 1C:
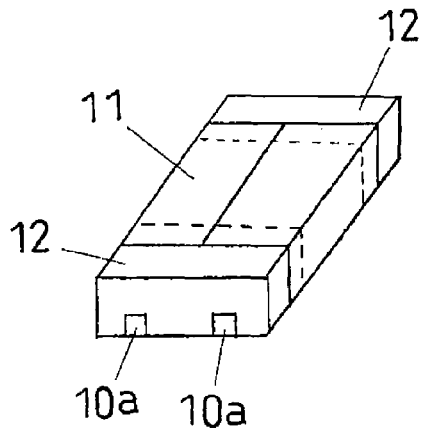
FIG. 1(C) is a schematic perspective view showing an external packaging completion state in which end portion reinforcing plastic components are attached.

FIGS. 1(A) to 1(C) sequentially show steps of forming the external packaging of a laminate battery to which the first invention is applied. This laminate battery is formed by disposing a battery main body 10 of a rectangular parallelepiped shape on a laminated external packaging material 11 having a width wider than that of the battery main body 10 as shown in FIG. 1(A), wrapping the battery main body 10 with the laminated external packaging material 11 as shown in FIG. 1(B) and thermally bonding the packaging material to the battery main body, inserting a part of an end portion reinforcing plastic component 12 of a rectangular parallelepiped shape into each rectangular cylindrical portion 11a formed, at each end of the main body, by both side excessive portions of the laminated external packaging material 11 as shown in FIG. 1(C) and then thermally bonding the packaging material 11 to the plastic component 12. The reference numeral "10a" in these figures denotes a terminal of the battery.

The battery main body 10 can be, e.g., a lithium-ion battery or a lithium-polymer battery with a surface formed by an oriented film, such as, e.g., a polyethylene terephthalate (PET) film, a polyethylene naphthalate (PEN) film, a polyamide (ON) film, or a polypropylene (OPP) film.

Figure 2:
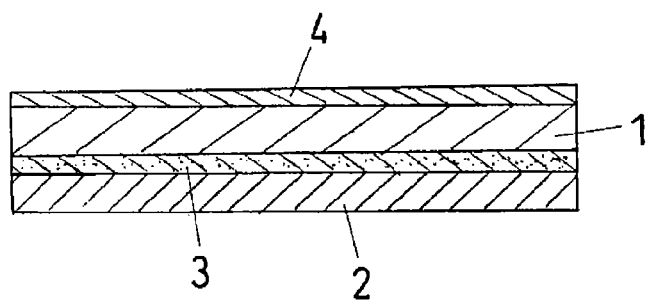
FIG. 2 is a vertical cross-sectional view of the laminated external packaging material for a battery according to an embodiment of the first embodiment.

As shown in FIG. 2, the laminated external packaging material 11 has a fundamental structure comprising a base film 1, a metallic foil 2 adhered to one surface of the base film 1 via an adhesive layer 3, and a coated film layer 4 of thermal adhesive resin adhered to the other surface of the base film 1.

The base film 1 can be a thermoplastic resin film, such as, e.g., a polypropylene (OPP) film, a polyethylene (PE) film, a polycarbonate (PC) film, an acrylonitrile-butadiene-styrene resin (ABS) film, or an adhesive polyamide (ON) film such as a 12 nylon. In order to attain assured thermal bonding of the base film to the end portion reinforcing plastic component 12 even with a smaller bonding area, it is preferable that the base film 1 is a film of thermoplastic resin which is the same series resin of the plastic component 12, more preferably a film of olefin series resin excellent in workability and insulation properties.

The thickness of this base film 1 is preferably set to about 20 to 100 μm to attain assured bonding to the uneven surface of the battery main body 10 by the pressure buffering function. If it is too thin, the pressure buffering function becomes insufficient, resulting in defective bonding to the uneven battery surface. Excessive thickness hardens the film, resulting in defective bonding.

As to the metallic foil 2, although it is not specifically limited, for example, a stainless foil, an iron foil, a copper foil, a nickel foil, and a hard aluminum foil can be exemplified. Among these foils, a hard aluminum foil can be preferable used.

As to the metallic foil 2, it is preferably that the thickness falls within the range of about 40 to 200 μm. If it is too thin, the material strength becomes insufficient. On the other hand, excessive thickness results in significantly deteriorated workability. As the adhesive components of the adhesive layer 3, polyester-urethane series or polyether-urethane series adhesive components can be preferably used.

As the thermal adhesive resin of the coated film layer 4, it is not specifically limited as long as the thermal adhesive resin has a softening point of 160° C. or below and can be bonded to the surface film of the battery main body 10. Especially, it is preferable that the thermal adhesive resin is ethylene-vinyl acetate copolymer (hereinafter abbreviated as "EVA") excellent in adhesiveness to an oriented film. However, it should be noted that, in cases where the softening point of this thermal adhesive resin is higher than 160° C., the thermal bonding temperature to the battery main body 10 should be higher, which may cause thermal degradation, such as, e.g., melting of separators in the battery main body 10 or decomposition of the electrolytic solution.

As the EVA for the coated film layer 4, it is preferable that the EVA is 30 to 95 mass % in vinyl acetate content and 3 or more in MI (melt index) because of the following reasons. If the vinyl acetate content is less than 30 mass %, it hardly solves in a solvent such as alcohol, resulting in difficult application to the base film 1. If the MI is less than 3, the thermal fluidity is poor, and therefore the molten EVA is hardly removed from the bonding portion to the end portion reinforcing plastic component 12 at the time of the thermal bonding, which in turn prevents strong bonding between the plastic component 12 and the base film 1. For the purpose of improving the coating performance, the EVA can be partially saponified into a graft polymer containing, e.g., an acetoxyl group, a carboxyl group, or a hydroxyl group to enhance the solubility to a solvent such as alcohol. Furthermore, in order to further improve the adhesiveness to an oriented film, a small amount of ethylene-acrylate copolymer (EEA) can be added to ethylene-vinyl acetate copolymer.

Furthermore, it is recommended to add a tackifier ingredient for improving the adhesion to the base film 1 and the hot tackiness and an antiblocking agent for preventing the blocking of the laminated external packaging material 11 in a wrapped state to the coated film layer 4 within the range of about 1 to 20 mass % to the resin, respectively.

As the aforementioned tackifier ingredient, terpene phenol resin, rosin and rosinester and petroleum resin can be exemplified. Although two or more of these ingredients can be used together, it is especially preferable that the tackifier ingredient has a softening point of 60 to 160° C. and an average molecular weight of 3,000 or less. If the softening point is below than 60° C., blocking can easily occur. If it exceeds 160° C., the thermal adhesiveness cannot be exerted at low temperatures. The average molecular weight exceeding 3,000 causes deterioration of solubility and compatibility to ethylene-vinyl acetate copolymer.

As the aforementioned antiblocking agent, inorganic particles, such as, e.g., $SiO_2$, $CaCO_3$, $BaCO_3$, $TiO_2$ or talc, can be exemplified. Although two or more of these agents can be used together, it is especially preferable that the inorganic particle has an average particle diameter of 1 to 10 μm and specific gravity of 3 or less. If the average particle diameter is less than 1 μm, the particles of the antiblocking agent agglutinates, which makes it difficult to be dispersed in the resin. To the contrary, if it exceeds 10 μm, clogging of a gravure plate occurs at the time of the gravure coating for forming the coated film layer 4. Furthermore, if the specific gravity exceeds 3, the particles tend to be easily settled out in the resin when heat is applied at the drying step after the coating, which may prevent exertion of antiblocking effects. Therefore, it is not preferable.

The coated film layer 4 can be formed on the base film 1 by adding resin components, such as, e.g., the aforementioned ethylene-vinyl acetate copolymer, and, if necessary, tackifier ingredient and antiblocking agent, to alcohol, mixing them into an emulsion, applying the emulsion on a base film 1 by a gravure coating method, and then drying it. The thickness of this coated film layer 4 is preferably set to as thin as 0.5 to 10 μm. It is technically difficult to decrease the thickness below 0.5 μm. If it exceeds 10 μm, it becomes difficult to be removed due to the thermal fluidity at the time of the thermal bonding to the end portion reinforcing plastic component 12, which makes it difficult to attain strong bonding between the base film 1 and the plastic component 12.

In order to wrap the battery main body 10 with the laminated external packaging material 11 as mentioned above, initially, the laminated external packaging material 11 is disposed with the coated film layer 4 facing up. Then, the battery main body 10 is disposed on the packaging material 11 as shown in FIG. 1(A). Thereafter, as shown in FIG. 1(B), the laminated external packaging material 11 is wrapped around the battery main body 10 and thermally bonded thereto by pressing a heated plate of 160° C. or below against the packaging material 11 from the outside thereof. As a result, the battery main body 10 and the laminated external packaging material 11 are thermally bonded and integrated with each other. At this time, the temperature for the thermal bonding is low, which prevents occurrence of thermal degradation, such as, e.g., melting of separators in the battery main body 10 or decomposition of the electrolytic solution. As a result, the high performance of the battery can be maintained.

With this thermal pressure-bonding, both widthwise side excessive portions of the laminated external packaging material 11 will be formed into a cylindrical portion 11a, respectively, at both ends of the battery main body 10. Next, a part of an end portion reinforcing plastic component 12 is fitted into the cylindrical portion 11a as shown in FIG. 1(C) and then a heated plate of 180 to 220° C. is pressed against the laminated external packaging material 11 and the plastic component 12 from the outside thereof to thermally bond them with each other.

At this time, the thermal adhesive resin of the coated film layer 4 forming both side cylindrical portions 11a and 11a of the laminated external packaging material 11 will turn into a molten solution low in viscosity and high in fluidity due to the high thermal pressure bonding temperature, and will be removed from the pressure bonding portion by the pressure of the heated plate. As result, the base film 1 of the laminated external packaging material 11 and the plastic component 12, which are made of the same series resin, will be direct-bonded firmly and integrated with each other. This high temperature thermal pressure-bonding is performed at a position away from the battery main body 10, and therefore there will be no risk of heat deterioration of the battery main body 10.

Figure 3:
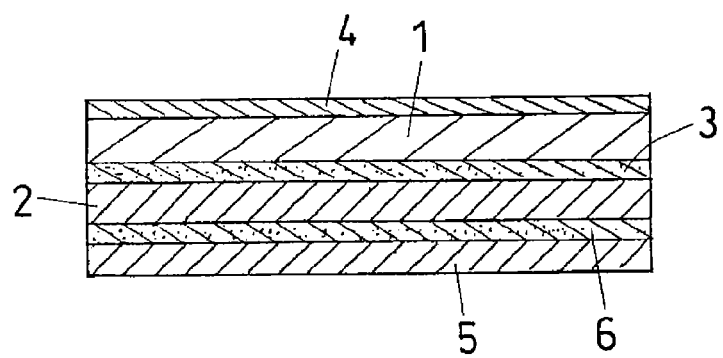
FIG. 3 is a vertical cross-sectional view of a laminated external packaging material for a battery according to another embodiment.
Figure 4:
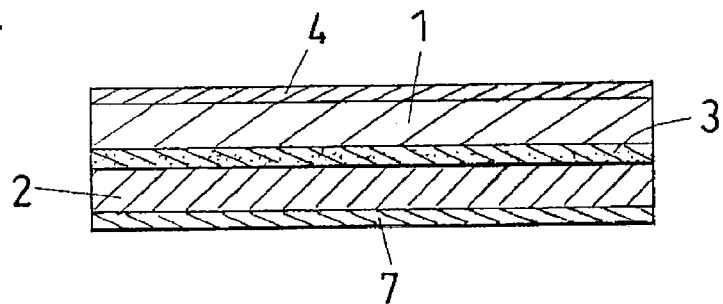
FIG. 4 is a vertical cross-sectional view of a laminated external packaging material for a battery according to still another embodiment.

In the laminated external packaging material 11 of the aforementioned embodiment, the metallic foil 2 will be exposed on the external periphery of the laminate battery. In the laminated external packaging material of the present invention, a protection layer can be preliminarily provided on the surface of the metallic foil 2 to give abrasion resistance, impact resistance, chemical resistance, or the like. Such protection layer can be formed by adhering an oriented film 5 on the surface of the metallic foil 2 opposite to the adhering side of the base film 1 via an adhesive layer 6 as shown in FIG. 3 or by applying thermoset resin on the surface of the metallic foil 2 opposite to the adhering side of the base film 1 to thereby form a thermoset resin layer 7 as shown in FIG. 4.

As the oriented film 5, a commonly used inexpensive all-purpose resin film, such as, e.g., PET, PEN, ON or OPP, can be used. It is preferable that the thickness thereof falls within the range of 8 to 40 μm. If it is less than 8 μm, it lacks versatility. If it exceeds 40 μm, it becomes expensive and the workability deteriorates. Furthermore, in order to improve the abrasion resistance, the oriented film 5 can be an oriented film with silica or alumina vacuum-deposited on the surface thereof, an oriented film with siloxane series resin coated on the surface thereof, or an oriented film with a roughened surface. The adhesive layer 6 can be the same as or similar to the adhesive layer 3 for adhering the base film 1 and the metallic foil 2.

On the other hand, the aforementioned thermoset resin layer 7 can be made of resin, such as, e.g., epoxy series resin, acrylic series resin, or nitrocellulose series resin, capable of forming a rigid film by thermal hardening. To increase the abrasion resistance, siloxane series resin of 5 mass % or less can be added to the aforementioned resin. It is preferable that the thickness of the thermoset resin layer 7 falls within the range of 0.5 to 5 μm. If it is too thin, insufficient effect as a protection layer can be obtained. To the contrary, if it is excessively thick, the resin layer becomes brittle and the processing unit cost also increases.

Next, a laminated external packaging material for a battery according to a second invention will be detailed.

Figure 5A:
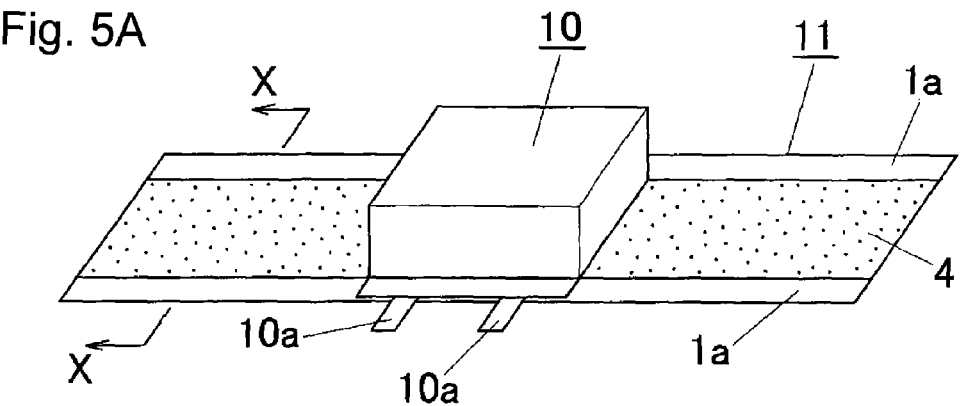
Figure 5B:
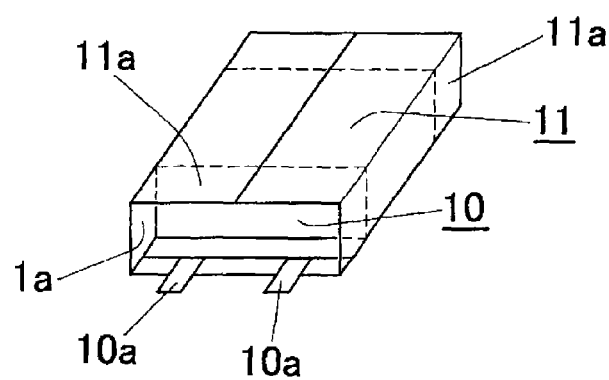
Figure 5C:
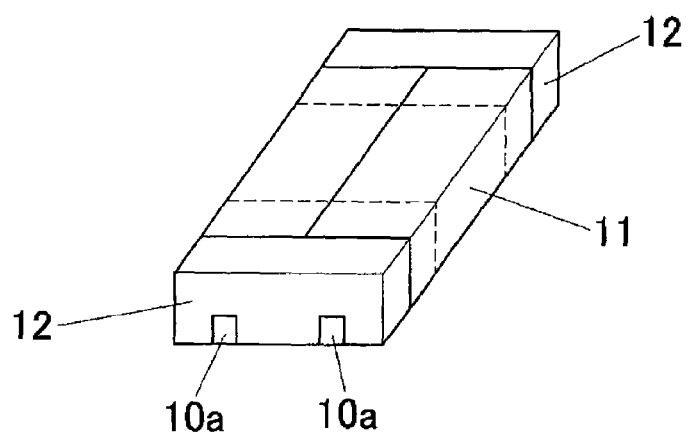
FIG. 5(C) is a schematic perspective view showing an external packaging completion state in which end portion reinforcing plastic components are attached.

FIGS. 5(A) to 5(C) sequentially show steps of forming the external packaging of a laminate battery to which the second invention is applied. This laminate battery is formed by disposing a battery main body 10 of a rectangular parallelepiped shape on a laminated external packaging material 11 having a width wider than that of the battery main body 10 as shown in FIG. 5(A), wrapping the battery main body 10 with the laminated external packaging material 11 and thermally bonding the coated film layer 4 of the laminated external packaging material 11 to the surface film of the battery main body 10 as shown in FIG. 5(B), inserting a part of an end portion reinforcing plastic component 12 of a rectangular parallelepiped shape into each rectangular cylindrical portion 11a formed, at each end of the main body, by both side excessive portions of the laminated external packaging material 11 as shown in FIG. 5(C), and then thermally bonding the exposed edge portion 1a (an edge portion where the base film 1 is exposed, i.e., a thermoset resin non-applied edge portion) of the base film of the inner surface of the cylindrical portion 11a to the plastic component 12 by thermal bonding. The reference numeral "10a" in these figures denotes a terminal of the battery.

The battery main body 10 can be, e.g., a lithium-ion battery or a lithium-polymer battery with a surface formed by an oriented film, such as, e.g., a polyethylene terephthalate (PET) film, a polyethylene naphthalate (PEN) film, a polyamide (ON) film, or a polypropylene (OPP) film.

Figure 6:
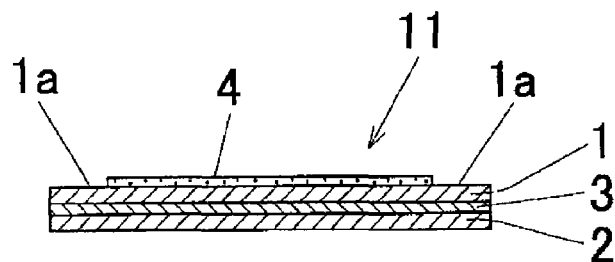
FIG. 6 shows a cross-sectional view (cross-section taken along the line X-X in FIG. 5) of the laminated external packaging material for a battery according to an embodiment of the second embodiment.

As shown in FIG. 6, the laminated external packaging material 11 has a fundamental structure comprising a base film 1, a metallic foil 2 adhered to one surface of the base film 1 via an adhesive layer 3, and a coated film layer 4 of thermal adhesive resin adhered to the other surface of the base film 1 with exposed side edge portions 1a and 1a of the base film 1 remained at both widthwise side edge portions of the base film 1.

The base film 1 can be a thermoplastic resin film, such as, e.g., a polypropylene (CPP) film, a polyethylene (PE) film, a polycarbonate (PC) film, an acrylonitrile-butadiene-styrene resin (ABS) film, or an adhesive polyamide (ON) film such as a 12 nylon. In order to attain assured thermal bonding of the base film to the end portion reinforcing plastic component 12 even with a smaller bonding area, it is preferable that the base film 1 is made of a film of thermoplastic resin which is the same series resin of the plastic component 12, more preferably a film of olefin series resin excellent in workability and insulation properties.

The thickness of this base film 1 is preferably set to about 20 to 100 μm to attain assured adhering to the uneven surface of the battery main body 10 by the pressure buffering function. If it is too thin, the pressure buffering function becomes insufficient, resulting in defective bonding to the uneven battery surface. Excessive thickness hardens the film, resulting in defective bonding.

As to the metallic foil 2, although it is not specifically limited, for example, a stainless foil, an iron foil, a copper foil, a nickel foil, and a hard aluminum foil can be exemplified. Among these foils, a hard aluminum foil can be preferable used.

As to the metallic foil 2, it is preferably that the thickness falls within the range of about 40 to 200 μm. If it is too thin, the material strength becomes insufficient. On the other hand, excessive thickness results in significantly deteriorated workability. As the adhesive components of the adhesive layer 3, polyester-urethane series or polyether-urethane series adhesive ingredients can be preferably used.

As the thermal adhesive resin of the coated film layer 4, it is not specifically limited as long as the thermal adhesive resin has a softening point of 160° C. or below and can be bonded to the surface film of the battery main body 10. Especially, it is preferable that the thermal adhesive resin is ethylene-vinyl acetate copolymer (hereinafter abbreviated as "EVA") excellent in adhesiveness to an oriented film. However, it should be noted that, in cases where the softening point of this thermal adhesive resin is higher than 160° C., the thermal bonding temperature to the battery main body 10 should be higher, which may cause thermal degradation, such as, e.g., melting of separators in the battery main body 10 or decomposition of the electrolytic solution.

As the EVA for the coated film layer 4, it is preferable that the EVA is 30 to 95 mass % in vinyl acetate content and 3 or more in MI (melt index) because of the following reasons. If the vinyl acetate content is less than 30 mass %, it hardly solves in a solvent such as alcohol, resulting in difficult application to the base film 1. For the purpose of improving the coating performance, the EVA can be partially saponified into a graft polymer containing, e.g., an acetoxyl group, a carboxyl group, or a hydroxyl group to enhance the solubility to a solvent such as alcohol. Furthermore, in order to further improve the adhesiveness to an oriented film, a small amount of ethylene-acrylate copolymer (EEA) can be added to ethylene-vinyl acetate copolymer.

Furthermore, it is recommended to add a tackifier ingredient for improving the adhesion to the base film 1 and the hot tackiness and an antiblocking agent for preventing the blocking of the laminated external packaging material 11 in a wrapped state to the coated film layer 4 within the range of about 1 to 20 mass % to the resin, respectively.

As the aforementioned tackifier ingredient, terpene phenol resin, rosin and rosinester and petroleum resin can be exemplified. Although two or more of these ingredients can be used together, it is especially preferable that the tackifier ingredient has a softening point of 60 to 160° C. and an average molecular weight of 3,000 or less. If the softening point is below than 60° C., blocking can easily occur. If it exceeds 160° C., the thermal adhesiveness cannot be exerted at low temperatures. The average molecular weight exceeding 3,000 causes deterioration of solubility and compatibility to ethylene-vinyl acetate copolymer.

As the aforementioned antiblocking agent, inorganic particles, such as, e.g., $SiO_2$, $CaCO_3$, $BaCO_3$, $TiO_2$ or talc, can be exemplified. Although two or more of these agents can be used together, it is especially preferable that the inorganic particle has an average particle diameter of 1 to 10 μm and specific gravity of 3 or less. If the average particle diameter is less than 1 μm, the particles of the antiblocking agent agglutinates, which makes it difficult to be dispersed in the resin. On the other hand, if it exceeds 10 μm, clogging of a gravure plate occurs at the time of the gravure coating for forming the coated film layer 4. Furthermore, if the specific gravity exceeds 3, the particles tend to be easily settled out in the resin when heat is applied at the drying step after the coating, which may prevent exertion of antiblocking effects. Therefore, it is not preferable.

Figure 10:
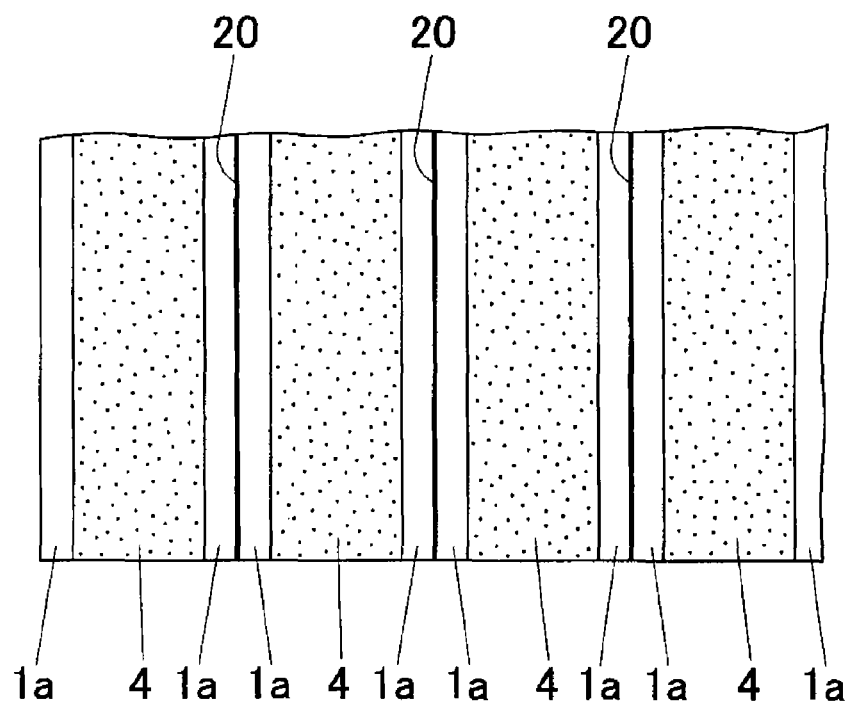
FIG. 10 is a plan view showing a laminated external packaging material before the cutting step in a production process.

The coated film layer 4 can be formed on the base film 1 by adding resin components, such as, e.g., the aforementioned ethylene-vinyl acetate copolymer, and, if necessary, tackifier ingredient and antiblocking agent, to alcohol, mixing them into an emulsion, applying the emulsion on a base film 1 by a gravure coating method, and then drying it. At this time, coloring agent, such as, e.g., organic series colorant, inorganic series colorant, or pigment, can be added to the resin components forming the coated film layer 4 within the range of 0.1 to 5 mass parts with respect to the resin component of 100 mass parts. For example, in forming a coated film layer 4 on an external packaging original material by a gravure coating method or the like, a narrow linear cutting line indication coated portion 20 can be simultaneously formed between adjacent exposed side edge portions 1a and 1a as shown in FIG. 10. In this case, since this cutting line indication coated portion 20 is colored, a positioning sensor of a cutting apparatus (width adjustable apparatus) can recognize the cutting line indication coated portion 20 at the time of cutting processing, which enables assured positioning of the cutting position.

Although the organic series colorant is not specifically limited, for example, azo series colorant, such as, e.g., lake red, naphthol, hanza yellow, disazo yellow, or benzimidazolone, polycyclic series colorant, such as, e.g., quinophtalone, isoindline, pyrrolopyrrole, dioxazine, phthalocyanine blue, or phtalocyanine green, and lake colorant, such as, e.g., lake red C or Watchung red can be exemplified. Although the inorganic series colorant is not specifically limited, for example, carbon black, titanium oxide, calcium carbonate, kaolin, iron oxide, and zinc oxide can be exemplified.

Although the pigment is not specifically limited, for example, yellow pigment such as trisodium salt (yellow color 4), red pigment such as dinatrium salt (red color 4), or blue pigment such as dinatrium salt (blue color 1) can be exemplified.

It is preferable that the thickness of the coated film layer 4 is set to 0.5 to 50 μm. It is technically difficult to set the thickness less than 0.5 μm. On the other hand, if the thickness exceeds 50 μm, adhesion to a casting mold may occur when used as a laminated external packaging material 11.

In order to wrap the battery main body 10 with the laminated external packaging material 11 as mentioned above, initially, the laminated external packaging material 11 is disposed with the coated film layer 4 facing up. Then, the battery main body 10 is disposed on the coated film layer 4 as shown in FIG. 5(A). Thereafter, as shown in FIG. 5(B), the laminated external packaging material 11 is wrapped around the battery main body 10 and thermally bonded thereto by pressing a heated plate of 160° C. or below against the packaging material 11 from the outside thereof. As a result, the battery main body 10 and the laminated external packaging material 11 are thermally bonded and integrated with each other via the molten thermoplastic resin of the coated film layer 4. At this time, the temperature for the thermal bonding is low, which prevents thermal degradation, such as, e.g., melting of separators in the battery main body 10 or decomposition of the electrolytic solution. As a result, the high performance of the battery can be maintained.

With this thermal pressure bonding, both widthwise side excessive portions of the laminated external packaging material 11 will be formed into a cylindrical portion 11a, respectively, at both ends of the battery main body 10. In this state, the exposed edge portions 1a (edge portions where the base film 1 is exposed, i.e., edge portions where thermoplastic resin is not applied) are exposed on the inner surface of the cylindrical portion 11a. Next, a part of an end portion reinforcing plastic component 12 is fitted into the cylindrical portion 11a as shown in FIG. 5(C), and then a heated plate of 180 to 220° C. is pressed against the laminated external packaging material 11 and the plastic component 12 from the outside thereof to thermally bond the plastic component 12 and the exposed edge portion 1a of the base film with each other. At this time, the base film 1 of the laminated external packaging material 11 and the plastic component 12 will be direct-bonded firmly and integrated with each other. However, this high temperature thermal pressure-bonding is performed at a position away from the battery main body 10, and therefore there will be no risk of heat deterioration of the battery main body 10.

In the laminated external packaging material 11 of the aforementioned embodiment, the metallic foil 2 will be exposed on the external periphery of the laminate battery. In the laminated external packaging material of the second invention, a protection layer can be preliminarily provided on the surface of the metallic foil 2 to give abrasion resistance, impact resistance, chemical resistance, and the like. Such protection layer can be formed by adhering an oriented film 5 on the surface of the metallic foil 2 opposite to the adhering side of the base film 1 as shown in FIG. 7 or by applying thermoset resin on the surface of the metallic foil 2 opposite to the adhering side of the base film 1 to thereby form a thermoset resin layer 7 as shown in FIG. 8.

As the oriented film 5, a commonly used inexpensive all-purpose resin film, such as, e.g., PET, PEN, ON or OPP, can be used. It is preferable that the thickness thereof falls within the range of 8 to 40 μm. If it is less than 8 μm, it lacks versatility. If it exceeds 40 μm, it becomes expensive and the workability deteriorates. Furthermore, in order to improve the abrasion resistance, the oriented film 5 can be an oriented film with silica or alumina vacuum-deposited on the surface thereof, an oriented film with siloxane series resin coated on the surface thereof, or an oriented film 5 with a roughened surface. The adhesive layer 6 can be the same as or similar to the adhesive layer 3 for adhering the base film 1 and the metallic foil 2.

On the other hand, the aforementioned thermoset resin layer 7 can be made of resin, such as, e.g., epoxy series resin, acrylic series resin, or nitrocellulose series resin, capable of forming a rigid film by thermal hardening. To increase the abrasion resistance, siloxane series resin of 5 mass % or less can be added to the aforementioned resin. It is preferable that the thickness of the thermoset resin layer 7 falls within the range of 0.5 to 5 µm. If it is too thin, insufficient effect as a protection layer can be obtained. On the other hand, if it is excessively thick, the resin layer becomes brittle and the processing unit cost also increases.

Figure 7:
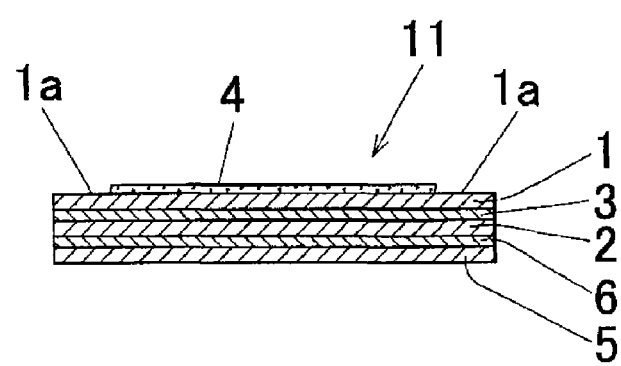
FIG. 7 is a cross-sectional view of a laminated external packaging material for a battery according to another embodiment.
Figure 8:
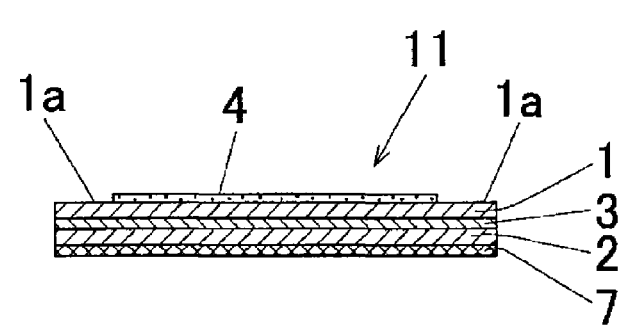
FIG. 8 is a cross-sectional view of a laminated external packaging material for a battery according to still another embodiment.
Figure 9:
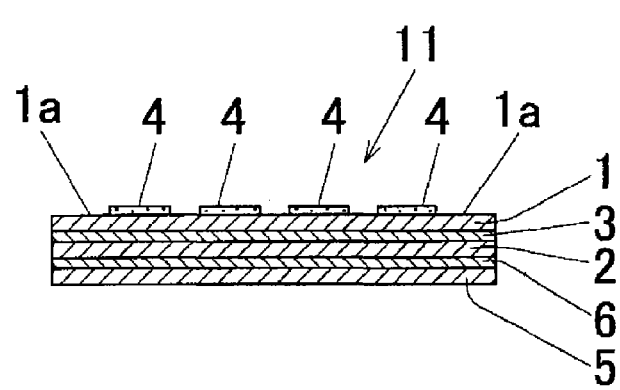
FIG. 9 is a cross-sectional view of a laminated external packaging material for a battery according to still yet another embodiment.

In the aforementioned embodiment, the coated film layer 4 of thermoset resin is formed on the entire surface of the base film 1 other than the exposed edge portions 1a and 1a of the base film 1 (see FIGS. 6 to 8). The coated film layer, however, is not limited to such structure, and can be, for example, constituted such that the coated film layers 4 are partially formed on the surface of the base film 1 other than the exposed edge portions 1a and 1a as shown in FIG. 9.

EXAMPLE

Hereinafter, Examples of the first invention will be detailed comparing with Comparative Examples. In the following explanation, "parts" and "%" denote "mass parts" and "mass %," respectively.

Example 1

A laminated film was prepared by adhering a PET film having a thickness of 12 µm as an oriented film on one surface side of a hard aluminum foil having a thickness of 100 µm made of JIS A3004-H18 material via polyester-urethane series adhesive and further adhering a CPP film (casting polypropylene film) having a thickness of 40 µm on the other surface side of the aluminum foil via the same adhesive as mentioned above. On the other hand, an application liquid having a resin solid content of 40% was prepared by adding a solvent in which isopropyl alcohol and deionized water were mixed at a capacity ratio of 1:1 to a resin mixture in which 30 parts EVA resin having a vinyl acetate content of 40% and MI of 15, 30 parts EVA having a saponification degree of 20%, 10 parts terpene resin having a softening point of 90° C. and an average molecular weight of 1,500, and 10 parts $SiO_2$ having a particle diameter of 2 to 5 µm and a specific gravity of 2.5 to 2.7. Then, this application liquid was applied onto the CPP film as the laminated film so that the thickness after drying became 3 µm, and then dried by heating at 200° C. for 20 seconds to form a coated film layer of thermal adhesive resin to thereby obtain a laminated external packaging material for a battery.

Example 2

A laminated external packaging material for a battery was produced in the same manner as in Example 1 except that the thickness of the coated film layer of thermal adhesive resin was set to 1 µm.

Example 3

A laminated external packaging material for a battery was produced in the same manner as in Example 1 except that a PC film having a thickness of 50 µm was used as the base film in place of the CPP film.

Example 4

A laminated external packaging material for a battery was produced in the same manner as in Example 1 except that, in place of adhering the PET film as an oriented film, thermosetting resin of epoxy resin was applied on the one surface side of the aluminum foil and heated to form a thermoset resin layer having a thickness of 2 µm.

Example 5

A laminated external packaging material for a battery was produced in the same manner as in Example 1 except that a PET film as an oriented film was not adhered.

Comparative Example 1

A laminated external packaging material for a battery was produced in the same manner as in Example 1 except that a coated film layer of thermal adhesive resin was directly formed on the one surface of the aluminum foil without using a CPP film as a base film.

Comparative Example 2

A laminated external packaging material for a battery was produced in the same manner as in Example 1 except that the thickness of the coated film layer of thermal adhesive layer was set to 15 µm.

[Performance Evaluation Test 1]

Using the laminated external packaging material in Examples 1-5 and Comparative Examples 1 and 2, in accordance with the method shown in FIGS. 1(A) to 1(C), thermal bonding to a battery main body of a lithium ion battery having a surface of a PET film was executed using a heated plate under the conditions of 160° C.×0.2 MPa×2 seconds, and thermal pressure bonding to an end portion reinforcing plastic component of PP was executed using a heated plate under the conditions of 200° C.×0.4 MPa×3 seconds to package the laminate battery. The results are shown in Table 1. In this table, the end portion reinforcing plastic component is abbreviated as "Plastic Comp."

[Performance Evaluation Test 2]

The laminated external packaging material in Examples 1-5 and Comparative Examples 1 and 2 was wrapped around a battery main body similar to that in Performance Evaluation Test 1 and fixed with an adhesive tape. Then, it was inserted into a 500 mm-by-500 mm polypropylene case with the adhesive tape side facing up, and irregular vibrations falling within the range of 5 to 100 Hz were given with a device according to JIS Z0232 for 6 hours, and then the external appearance of the laminated external packaging member and the existence or nonexistence of electrolytic solution leakage were observed. The results are shown in Table 1. The external appearance of the laminated external packaging material was evaluated as follows:

"⊚" . . . No external appearance change
"○" . . . slight cracks were generated on the external surface
"x" . . . Cracks were generated outstandingly

TABLE 1

| | Laminated external packaging material | | | |
|---|---|---|---|---|
| | Performance Evaluation Test 1: Bonding strength (N/15 mm) | | Performance Evaluation Test 2: Vibration test | |
| | Battery main body | Plastic Comp. | External appearance | Electrolytic solution leakage |
| Example 1 | 4.5 | 80.2 | ◎ | Nil |
| Example 2 | 4.0 | 82.5 | ◎ | Nil |
| Example 3 | 4.3 | 20.2 | ◎ | Nil |
| Example 4 | 4.3 | 85.6 | ○ | Nil |
| Example 5 | 4.2 | 80.4 | X | Nil |
| Comp. Ex. 1 | 4.5 | 2.1 | ◎ | Nil |
| Comp. Ex. 2 | 5.2 | 3.1 | ◎ | Nil |

As will be apparent from the results shown in Table 1, in the laminated external packaging material for a battery according to the first invention (Examples 1 to 5), the packaging material can be thermally bonded easily and assuredly to the resin film surface of the battery main body and also can be thermally bonded firmly to the end portion reinforcing plastic component regardless of the small bonding area. Furthermore, in the laminated external packaging material for a battery of Examples 1 to 4, since cracks are hardly generated even by the vibration test for the packaged laminate battery and it is excellent in strength, there is no risk of deterioration of the external appearance as a laminate battery as a final appearance and occurrence of electrolytic solution leakage.

Next, Examples of the second invention will be detailed comparing with Comparative Examples will be detailed. In the following explanation, "parts" and "%" denote "mass parts" and "mass %," respectively.

Example 6

A laminated film was prepared by adhering a PET film having a thickness of 12 μm as an oriented film on one surface side of a hard aluminum foil having a thickness of 100 μm made of JIS A3004-H18 material via polyester-urethane series adhesive and further adhering a CPP film (casting polypropylene film) having a thickness of 40 μm on the other surface side of the aluminum foil via the same adhesive as mentioned above. On the other hand, an application liquid having a resin solid content of 40% was prepared by adding a solvent in which isopropyl alcohol and deionized water were mixed at a capacity ratio of 1:1 to a resin mixture in which 30 parts EVA resin having a vinyl acetate content of 40% and MI of 15, 30 parts EVA having a saponification degree of 20%, 10 parts terpene resin having a softening point of 90° C. and an average molecular weight of 1,500, and 10 parts $SiO_2$ having a particle diameter of 2 to 5 μm and a specific gravity of 2.5 to 2.7. Then, this application liquid was applied onto the CPP film as the laminated film at certain intervals (see FIG. 10) so that the thickness after drying became 3 μm, and then dried by heating at 200° C. for 20 seconds to form a coated film layer 4 of thermal adhesive resin. Then, it was cut at the cutting line indication coated film portions 20 with a cutting device into laminated external packaging materials 11 for a battery. In this laminated external packaging material 11 for a battery, a coated film layer 4 was formed in a state in which base film exposed edge portions 1a and 1a were remained at both widthwise side edge portions of the base film 1.

Example 7

A laminated external packaging material for a battery was produced in the same manner as in Example 6 except that the thickness of the coated film layer of thermal adhesive resin was set to 10 μm.

Example 8

A laminated external packaging material for a battery was produced in the same manner as in Example 6 except that a PC film having a thickness of 50 μm was used as the base film in place of the CPP film.

Example 9

A laminated external packaging material for a battery (see FIG. 8) was produced in the same manner as in Example 6 except that, in place of adhering the PET film as an oriented film, thermosetting resin of epoxy resin was applied on the one surface side of the aluminum foil and heated to form a thermoset resin layer having a thickness of 2 μm.

Comparative Example 3

A laminated external packaging material for a battery was produced in the same manner as in Example 6 except that a coated film layer of thermal adhesive resin having a thickness of 15 μm was formed on the entire surface of a CPP film as a base film.

[Performance Evaluation Test 2]

Using the laminated external packaging material in Examples 6-9 and Comparative Example 3, in accordance with the method shown in FIGS. 5(A) to 5(C), thermal bonding to a battery main body of a lithium ion battery having a surface of a polyamide (ON) film was executed using a heated plate under the conditions of 160° C.×0.2 MPa×2 seconds, and thermal pressure bonding to an end portion reinforcing plastic component of PP was executed using a heated plate under the conditions of 180° C.×0.4 MPa×3 seconds to package the laminate battery. The bonding strength to the battery main body of the laminated external packaging material and to the end portion reinforcing plastic component was measured. The results are shown in Table 2. In this table, the end portion reinforcing plastic component is abbreviated as "Plastic Comp."

[Performance Evaluation Test 4]

Each laminated external packaging material in Examples 6-9 and Comparative Example 3 was wrapped around a battery main body similar to that in Performance Evaluation Test 3 and fixed with an adhesive tape. Then, it was inserted into a 500 mm-by-500 mm polypropylene case with the adhesive tape side facing up, and irregular vibrations falling within the range of 5 to 100 Hz were given with a device according to JIS Z0232 for 6 hours, and then the external appearance of the laminated external packaging member and the existence or nonexistence of electrolytic solution leakage were observed. The results are shown in Table 2.

TABLE 2

| | Laminated external packaging material | | | |
|---|---|---|---|---|
| | Performance Evaluation Test 1: (N/15 mm) | | Performance Evaluation Test 2: Vibration test | |
| | Battery main body | Plastic Comp. | External appearance | Electrolytic solution leakage |
| Example 6 | 4.5 | 85.2 | ⊚ (No change) | Nil |
| Example 7 | 4.0 | 80.5 | ⊚ (No change) | Nil |
| Example 8 | 4.3 | 25.1 | ⊚ (No change) | Nil |
| Example 9 | 4.3 | 82.3 | ⊚ (No change) | Nil |
| Comp. Ex. 3 | 4.5 | 2.1 | Plastic Comp. was detached, deformed | Nil |

As will be apparent from the results shown in Table 2, in the laminated external packaging material for a battery according to the second invention (Examples 6 to 9), the packaging material can be thermally bonded easily and assuredly to the resin film surface of the battery main body and also can be thermally bonded firmly to the end portion reinforcing plastic component regardless of the small bonding area. Furthermore, in the laminated external packaging material for a battery, since the packaging material does not cause detachment of the end portion reinforcing plastic component even by the vibration test for the packaged laminate battery and it is excellent in strength, there is no risk of deterioration of the external appearance as a laminate battery as a final appearance and occurrence of electrolytic solution leakage.

On the other hand, in Comparative Example 3 in which a coated film layer was formed on the entire surface of the base film, since the thermal adhesive resin of the coated film layer remained unremoved between the base film and the end portion reinforcing plastic component under the thermal pressure-bonding conditions of 180° C.×0.4 MPa×3 seconds, the bonding strength of the external packaging material to the end portion reinforcing plastic component was insufficient.

This application claims priority to Japanese Patent Applications No. 2005-369446 filed on Dec. 22, 2005 and Japanese Patent Application No. 2005-369460 filed on Dec. 22, 2005, the entire disclosures of which are incorporated here in by reference in their entireties.

The terms and expressions which have been employed herein are used as terms of description and not of limitation of this invention. It should be recognized that various any modifications are possible within the scope of the invention claimed so long as they do not extend beyond the spirit of the invention.

INDUSTRIAL APPLICABILITY

A laminated external packaging material for a battery according to the present invention can be used as a laminated external packaging material for wrapping a main body of a battery for use as a power source for a mobile device, such as, e.g., a mobile telephone, a notebook-size personal computer, or a digital camera.

The invention claimed is:

1. A laminated external packaging material for a battery, comprising:
   a base film having a first surface and a second surface opposite to the first surface;
   a metallic foil adhered to the first surface of the base film; and
   a coated film layer formed on the second surface of the base film,
   wherein the coated film layer comprises a thermal adhesive resin having a softening point of 160° C. or below and capable of thermally bonding to a surface film of a battery main body such that the laminated external packaging material is wrapped around the battery main body with the coated film layer in contact with the battery main body and thermally bonded thereto, the base film comprises a thermoplastic resin capable of thermally bonding to an end portion reinforcing plastic component of a laminate battery, and the coated film layer is formed to have a thickness of 0.5 to 10 µm such that a portion of the coated film layer subjected to thermal pressure bonding is removed upon the base film being thermally bonded to the end portion reinforcing plastic component.

2. The laminated external packaging material for a battery as recited in claim 1, wherein the thermal adhesive resin of the coated film layer comprises an ethylene-vinyl acetate copolymer.

3. The laminated external packaging material for a battery as recited in claim 1, further comprising an oriented film having a thickness of 8 to 40 µm and adhered to a surface of the metallic foil on an opposite side of the base film.

4. The laminated external packaging material for a battery as recited in claim 1, further comprising a thermoset resin layer having a thickness of 0.5 to 5 µm and adhered to a surface of the metallic foil on an opposite side of the base film.

5. The laminated external packaging material for a battery as recited in claim 1, wherein the metallic foil comprises a hard aluminum foil hardened by a hardening treatment.

6. A laminate battery comprising:
   a battery main body having a first end portion and a second end portion opposite to the first end portion; and
   the laminated external packaging material as recited in any one of claims 1, 2 and 3-5 being wrapped around the battery main body with the coated film layer in contact with the battery main body and thermally bonded thereto, the laminated external packaging material having excessive portions forming cylindrical portions in the first end portion and the second end portion; and an end portion reinforcing plastic component having at least a portion inserted in each of the cylindrical portions and protruded from each of the first and second end portions of the battery main body and thermally bonded to the base film of the laminated external packaging material.

7. A laminated external packaging material for a battery, comprising:
a base film having a first surface and a second surface opposite to the first surface;
a metallic foil adhered to the first surface of the base film; and
a coated film layer formed on the second surface of the film such that exposed edge portions are formed in widthwise edge portions of the base film and positioned to face an end portion reinforcing plastic component of a laminate battery,
wherein the coated film layer comprises a thermal adhesive resin having a softening point of 160° C. or below and capable of thermally bonding to a surface film of a battery main body such that the laminated external packaging material is wrapped around the battery main body with the coated film layer in contact with the battery main body and thermally bonded thereto, and the base film comprises a thermoplastic resin capable of thermally bonding to the end portion reinforcing plastic component of the laminate battery.

8. The laminated external packaging material for a battery as recited in claim 7, wherein the thermal adhesive resin of the coated film layer comprises an ethylene-vinyl acetate copolymer.

9. The laminated external packaging material for a battery as recited in claim 7, further comprising an oriented film having a thickness of 8 to 40 μm and adhered to a surface of the metallic foil on an opposite side of the base film.

10. The laminated external packaging material for a battery as recited in claim 7, further comprising a thermoset resin layer having a thickness of 0.5 to 5 μm and adhered to a surface of the metallic foil on an opposite side of the base film.

11. The laminated external packaging material for a battery as recited in claim 7, wherein the metallic foil comprises a hard aluminum foil hardened by a hardening treatment.

12. A laminate battery comprising:
a battery main body having a first end portion and a second end portion opposite to the first end portion; and
the laminated external packaging material as recited in any one of claims 8 and 9-11 being wrapped around the battery main body with the coated film layer in contact with the battery main body and thermally bonded thereto, the laminated external packaging material having excessive portions forming cylindrical portions in the first end portion and the second end portion, and having a base film exposed edge portion on an inner surface of the cylindrical portions; and
an end portion reinforcing plastic component having at least a portion inserted in each of the cylindrical portions and protruded from each of the first and second end portions of the battery main body and thermally bonded to the base film exposed edge portion of the inner surface of the cylindrical portion.

13. The laminated external packaging material for a battery as recited in claim 1, wherein the thermoplastic resin comprises at least one of polypropylene, polyethylene, polycarbonate, an acrylonitrile-butadiene-styrene resin, and an adhesive polyamide.

14. The laminated external packaging material for a battery as recited in claim 1, wherein the thermoplastic resin comprises an olefin series resin.

15. The laminated external packaging material for a battery as recited in claim 7, wherein the thermoplastic resin comprises at least one of polypropylene, polyethylene, polycarbonate, an acrylonitrile-butadiene-styrene resin, and an adhesive polyamide.

16. The laminated external packaging material for a battery as recited in claim 7, wherein the thermoplastic resin comprises an olefin series resin.

* * * * *